United States Patent
Kawano

(10) Patent No.: US 10,467,479 B2
(45) Date of Patent: Nov. 5, 2019

(54) IMAGE PROCESSING APPARATUS, METHOD, AND STORAGE MEDIUM FOR REDUCING A VISIBILITY OF A SPECIFIC IMAGE REGION

(71) Applicant: CANON KABUSHIKI KAISHA, Tokyo (JP)

(72) Inventor: Atsushi Kawano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 14/966,567

(22) Filed: Dec. 11, 2015

(65) Prior Publication Data

US 2016/0171332 A1  Jun. 16, 2016

(30) Foreign Application Priority Data

Dec. 16, 2014  (JP) ................................ 2014-254600

(51) Int. Cl.
*G06K 9/00* (2006.01)
*G06T 7/215* (2017.01)
(Continued)

(52) U.S. Cl.
CPC .......... *G06K 9/00771* (2013.01); *G06T 7/194* (2017.01); *G06T 7/215* (2017.01);
(Continued)

(58) Field of Classification Search
None
See application file for complete search history.

(56) References Cited

U.S. PATENT DOCUMENTS

| 2010/0131442 A1 | 5/2010 | Sheu |
| 2011/0158470 A1* | 6/2011 | Martin ................. H04N 19/647 382/100 |

(Continued)

FOREIGN PATENT DOCUMENTS

| CN | 103098093 A | 5/2013 |
| EP | 0671706 A2 | 9/1995 |

(Continued)

OTHER PUBLICATIONS

Ikeda et al., "Background Image Generation with Quick Adaptation to Uniform Image Fluctuations," Information Technology Research Laboratories, NEC Corporation, Technical Report of the Institute of Electronics, Information and Communication Engineers, vol. 97, No. 40, pp. 49-56, May 15, 1997.

*Primary Examiner* — Bernard Krasnic
(74) *Attorney, Agent, or Firm* — Canon U.S.A., Inc. IP Division

(57) ABSTRACT

An image processing apparatus includes, an input unit configured to input images, a first detection unit configured to detect a first area based on features in the images input by the input unit, a second detection unit configured to detect a second area based on variations between the images input by the input unit, a generation unit configured to generate a background image by using a result of the first area detection by the first detection unit and a result of the second area detection by the second detection unit, and a processing unit configured to perform image processing for reducing a visibility of a specific region identified through a comparison between a processing target image acquired after a generation of the background image by the generation unit and the background image.

9 Claims, 9 Drawing Sheets

(51) Int. Cl.
*G06T 7/194* (2017.01)
*G08B 13/196* (2006.01)
*H04N 5/232* (2006.01)
*H04N 5/272* (2006.01)
*G06T 7/254* (2017.01)

(52) U.S. Cl.
CPC ........ *G06T 7/254* (2017.01); *G08B 13/19604* (2013.01); *G08B 13/19686* (2013.01); *H04N 5/23219* (2013.01); *H04N 5/23229* (2013.01); *H04N 5/272* (2013.01); *G06T 2207/30232* (2013.01)

(56) References Cited

U.S. PATENT DOCUMENTS

| | | | |
|---|---|---|---|
| 2011/0242345 A1* | 10/2011 | O'Gorman | G06F 21/6263 348/222.1 |
| 2012/0106849 A1 | 5/2012 | Tojo | |
| 2012/0189165 A1* | 7/2012 | Sun | G06K 9/00362 382/103 |
| 2012/0293662 A1 | 11/2012 | Ota | |
| 2013/0330006 A1* | 12/2013 | Kuboyama | G06K 9/3241 382/190 |
| 2014/0161312 A1 | 6/2014 | Adachi | |
| 2017/0344832 A1* | 11/2017 | Leung | G06K 9/00771 |

FOREIGN PATENT DOCUMENTS

| | | |
|---|---|---|
| EP | 0986036 A2 | 3/2000 |
| EP | 2555162 A1 | 2/2013 |
| JP | H10-187996 A | 7/1998 |
| JP | 2001186323 A | 7/2001 |
| JP | 2009-225398 A | 10/2009 |
| JP | 2011-182026 A | 9/2011 |
| JP | 2013-101558 A | 5/2013 |
| JP | 2013-152669 A | 8/2013 |

* cited by examiner

IMAGE PROCESSING APPARATUS, METHOD, AND STORAGE MEDIUM FOR REDUCING A VISIBILITY OF A SPECIFIC IMAGE REGION

BACKGROUND OF THE INVENTION

Field of the Invention

The present invention relates to a method for generating an image containing a concealed image.

Description of the Related Art

With the increasing number of monitoring cameras currently installed in various places, the importance of the privacy protection for individuals captured by monitoring cameras is also increasing. Japanese Patent Application Laid-Open No. 2009-225398 discusses a technique for generating a foreground image and a background image containing no person based on input images, and for controlling whether the foreground image is to be superimposed onto the background image according to user's authority. Japanese Patent Application Laid-Open No. 2009-225398 also discusses that, instead of superimposing the foreground image onto the background image, a protected image (concealed image) formed by applying concealment processing (masking processing or filter processing) to the foreground image can be superimposed onto the background image.

However, there may be a case where an area which should be concealed is not concealed.

For example, assume a case of performing processing for detecting a human body area from input images, generating a background image based on images of areas other than a human body area, and, within the relevant background image, combining a concealed image with a protection area identified based on the comparison between the background image and captured images. In this case, if the processing for detecting a human body area from input images fails, a background image containing a human body may be generated. If a human body is contained in the background image, an area which should be concealed may not be concealed.

When combining a concealed image with the background image as described above, if illumination variations occur since the time of background image generation till the time of image capturing, an error may occur in identifying a protection area based on the comparison between each of captured images and the background image. In this case, a concealed image may be combined with an area which does not need to be concealed.

SUMMARY OF THE INVENTION

According to an aspect of the present invention, an image processing apparatus includes, an input unit configured to input images, a first detection unit configured to detect a first area based on features in the images input by the input unit, a second detection unit configured to detect a second area based on variations between the images input by the input unit, a generation unit configured to generate a background image by using a result of the first area detection by the first detection unit and a result of the second area detection by the second detection unit, and a processing unit configured to perform image processing for reducing a visibility of a specific region identified through a comparison between a processing target image acquired after a generation of the background image by the generation unit and the background image.

Further features of the present invention will become apparent from the following description of exemplary embodiments with reference to the attached drawings.

DESCRIPTION OF THE EMBODIMENTS

An exemplary embodiment will be described in detail below with reference to the accompanying drawings. Configurations described in the following exemplary embodiment are to be considered as illustrative, and the present invention is not limited to illustrated configurations.

Figure 1:
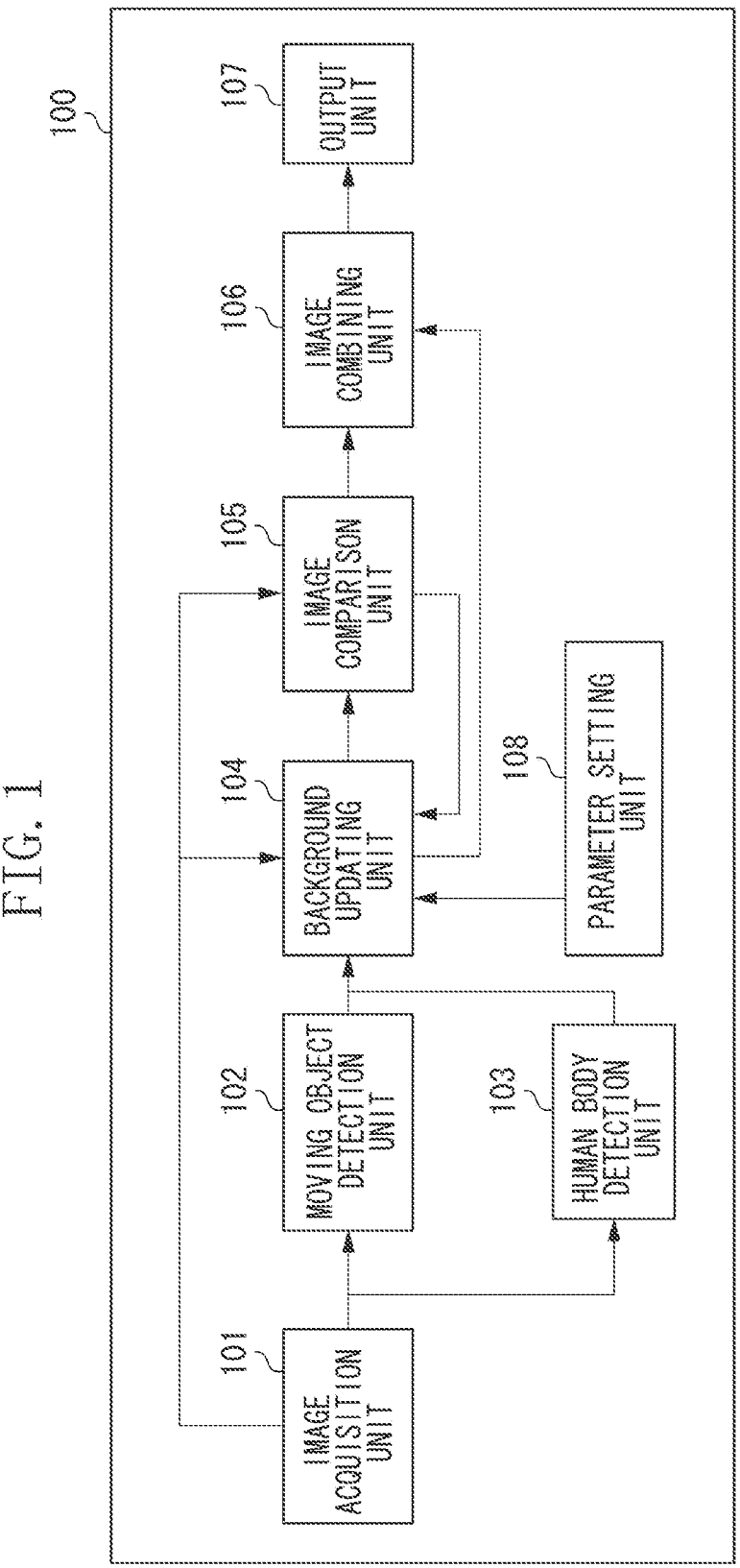
FIG. 1 is a block diagram illustrating a module configuration of an image processing apparatus according to an exemplary embodiment.
Figure 2:
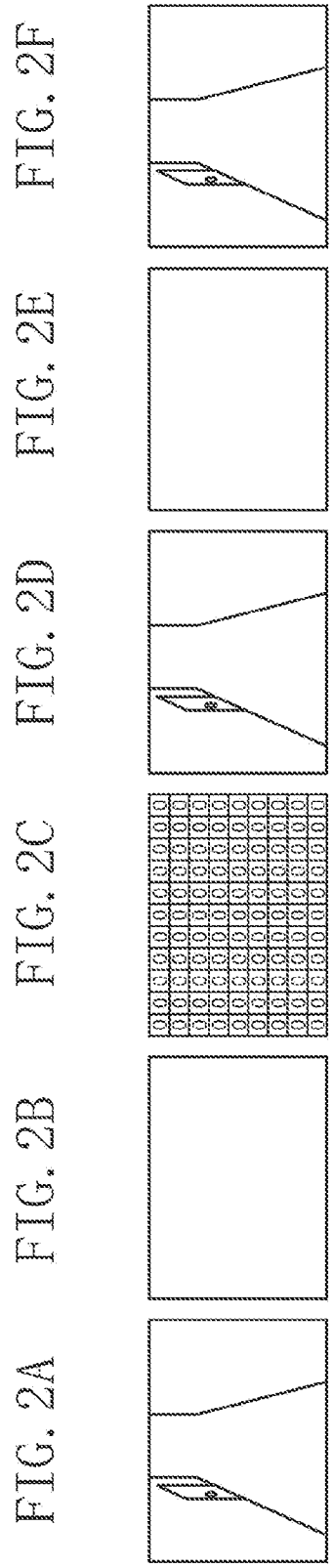
FIGS. 2A, 2B, 2C, 2D, 2E, and 2F illustrate processing according to the exemplary embodiment.
Figure 3:
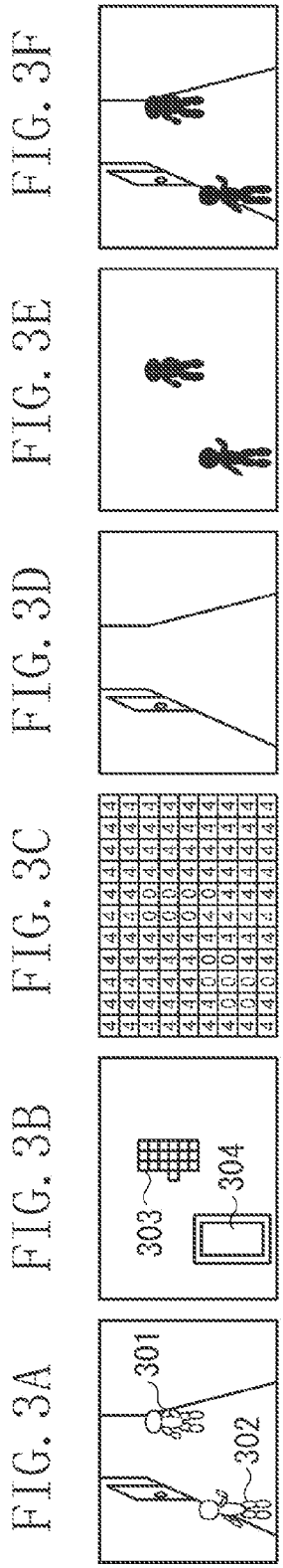
FIGS. 3A, 3B, 3C, 3D, 3E, and 3F illustrate processing 2 according to the exemplary embodiment.
Figure 4:
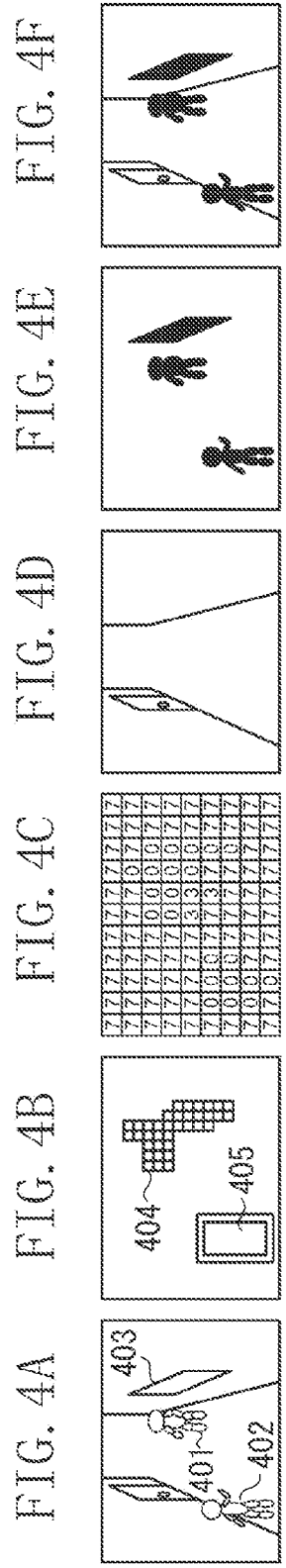
FIGS. 4A, 4B, 4C, 4D, 4E, and 4F illustrate processing 3 according to the exemplary embodiment.
Figure 5:
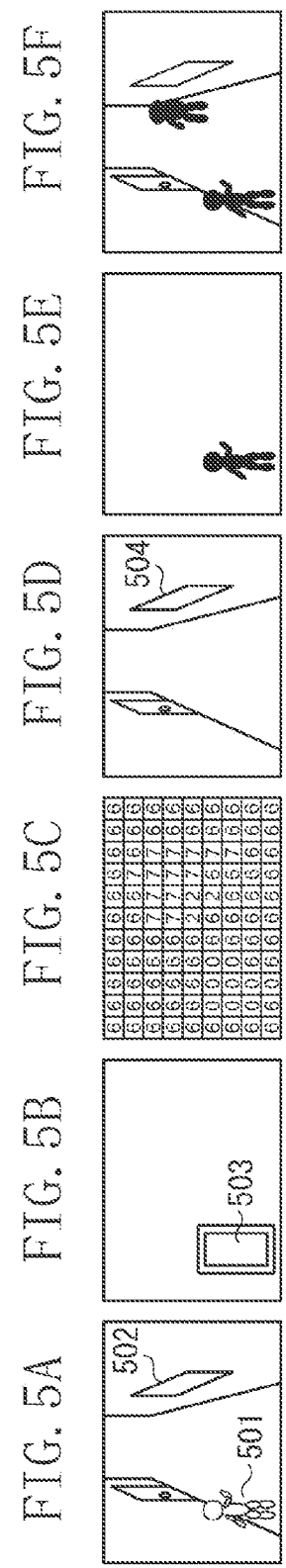
FIGS. 5A, 5B, 5C, 5D, 5E, and 5F illustrate processing 4 according to the exemplary embodiment.

FIG. 1 is a block diagram illustrating a configuration of an image processing apparatus 100. The image processing apparatus 100 includes an image acquisition unit 101, a moving object detection unit 102, a human body detection unit 103, a background updating unit 104, an image comparison unit 105, an image combining unit 106, an output unit 107, and a parameter setting unit 108.

The image acquisition unit 101 sequentially acquires images at predetermined intervals from an imaging unit including a lens and a sensor, and provides the moving object detection unit 102, the human body detection unit 103, the background updating unit 104, and the image comparison unit 105 with the acquired images. Although the present exemplary embodiment will be described below centering on a case where the image acquisition unit 101 operates as an imaging unit, images may be acquired from an external apparatus and may be read from a memory.

The moving object detection unit 102 performs moving object detection processing for detecting a moving object from images acquired by the image acquisition unit 101. The moving object detection unit 102 according to the present exemplary embodiment detects a moving object by comparing each of images acquired by the image acquisition unit 101 with a background model (background subtraction method). More specifically, the moving object detection unit 102 detects a moving object area based on the comparison between each of images acquired by the image acquisition unit 101 and other images captured at different times from the relevant acquired images. The moving object detection unit 102 suitably updates the background model by tracking variations in images.

The moving object detection unit 102 provides the background updating unit 104 with moving object information acquired by the moving object detection processing. The moving object information according to the present exemplary embodiment includes information about the center coordinates (position information) and information about the circumscribed rectangle (shape information) of a moving object detected from the images. The moving object detection unit 102 performs the moving object detection processing on each of a plurality of images acquired by the image acquisition unit 101, and provides the background updating unit 104 with the moving object information acquired as a result of the processing.

The human body detection unit 103 performs human body detection processing for detecting a human body from images acquired by the image acquisition unit 101. The human body detection unit 103 according to the present exemplary embodiment detects a human body by comparing each of images acquired by the image acquisition unit 101 with a predetermined pattern image (pattern matching method). However, the method for detecting a human body via the human body detection unit 103 is not limited to the above-described method, and may be based on feature quantities such as the image color, luminance, intensity gradient, texture, and machine learning. The human body detection unit 103 provides the background updating unit 104 with human body information acquired by the human body detection processing. The human body information according to the present exemplary embodiment includes information about the center coordinates (position information) and information about the circumscribed rectangle (shape information) of a human body detected from images. The human body detection unit 103 performs the human body detection processing on each of a plurality of images acquired by the image acquisition unit 101, and provides the background updating unit 104 with the human body information acquired as a result of the processing.

The background updating unit 104 generates a background image based on images acquired by the image acquisition unit 101, the moving object information acquired from the moving object detection unit 102, the human body information acquired from the human body detection unit 103, and protection area proportion information acquired from the image comparison unit 105. The background updating unit 104 provides the image comparison unit 105 and the image combining unit 106 with the generated background image. Processing for generating a background image by the background updating unit 104 will be described in detail below.

The image comparison unit 105 generates protection area information and protection area proportion information by comparing each of images acquired by the image acquisition unit 101 with the background image acquired from the background updating unit 104. The protection area information indicates the position and shape of a protection area within the image. The image comparison unit 105 provides the image combining unit 106 with the generated protection area information.

The protection area proportion information indicates the proportion of the protection area to the area of the image. The image comparison unit 105 provides the background updating unit 104 with the generated protection area proportion information. A method for generating the protection area information and the protection area proportion information by the image comparison unit 105 will be described below.

The image combining unit 106 combines, within the background image acquired from the background updating unit 104, a predetermined image with the protection area indicated by the protection area information acquired from the image comparison unit 105 to generate a protected image. A method for generating a protected image will be described in detail below. The image combining unit 106 provides the output unit 107 with the generated protected image.

The output unit 107 displays the protected image acquired from the image combining unit 106. When the image processing apparatus 100 is mounted on a network camera, the output unit 107 is able to transmit the protected image to a monitoring apparatus connected via a network. Further, when the image processing apparatus 100 is mounted on a monitoring apparatus, the image processing apparatus 100 combines a predetermined image with the background image acquired from the network camera to generate a protected image, and instructs the monitoring apparatus to display the relevant protected image.

The parameter setting unit 108 acquires a time threshold value and a weight value. The parameter setting unit 108 is also able to acquire the above-described values based on a specification from a user, or by reading their default values from a memory. The method for acquiring the relevant values is not limited to a certain method. The parameter setting unit 108 provides the background updating unit 104 with the acquired time threshold value and weight value. Each value will be described in detail below.

Figure 9:
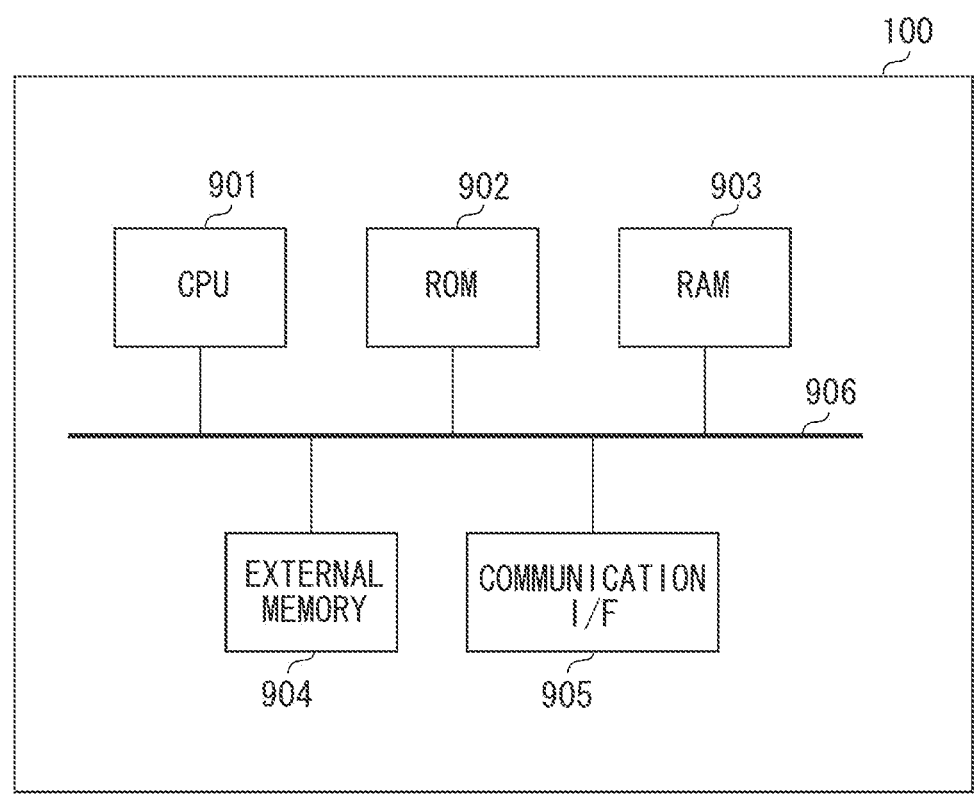
FIG. 9 is a block diagram illustrating a hardware configuration of the image processing apparatus according to the exemplary embodiment.

FIG. 9 illustrates an example of a hardware configuration of the image processing apparatus 100. The image processing apparatus 100 includes a central processing unit (CPU) 901, a read only memory (ROM) 902, a random access memory (CRAM) 903, an external memory 904, a communication interface (I/F) 905, and a system bus 906.

The CPU 901 totally controls operations of the image processing apparatus 100, i.e., controls each of construction units 902 to 905 via the system bus 906.

The ROM 902, a nonvolatile memory, stores a control program required for the CPU 901 to perform processing. The relevant program may be stored in the external memory 904 or a detachably attached storage medium.

The RAM 903 functions as a main memory for the CPU 901 and a work area. More specifically, when performing processing, the CPU 901 loads a required program from the ROM 902 into the RAM 903 and then executes the relevant program, thus implementing various functions and operations.

The external memory 904 stores, for example, various data and various information required for the CPU 901 to perform processing by using a program. The external memory 904 also stores, for example, various data and various information acquired when the CPU 901 performs processing based on a program.

The communication I/F 905 is an interface for communicating with an external apparatus. The communication I/F 905 is, for example, a local area network (LAN) interface. The present exemplary embodiment will be described below centering on a case where the image processing apparatus 100 is mounted on a network camera. In this case, the external apparatus is assumed to be a monitoring apparatus or recording apparatus connected to the network camera via a network. However, the image processing apparatus 100 may be mounted on a monitoring apparatus or a recording apparatus. When the image processing apparatus 100 is mounted on a monitoring apparatus, the external apparatus is assumed to be a network camera or recording apparatus connected to the monitoring apparatus via a network. The system bus 906 connects the CPU 901, the ROM 902, the RAM 903, the external memory 904, and the communication I/F 905 so that they are able to communicate with each other.

A method for generating a background image via the background updating unit 104 will be described below. The background updating unit 104 manages the stable background time for each of division areas (blocks) formed by dividing the background image in a predetermined size. The stable background time corresponds to a period during which a protection target identified based on the moving object information and the human body information has not been detected.

Processing for generating a background image by the background updating unit 104 will be described below based on three different cases: (A) Initial image, (B) When the protection area proportion is smaller than a threshold value, and (C) When the protection area proportion is equal to or larger than the threshold value.

(A) Initial Image

This case is a case where no background image has been generated. In this case, the background updating unit 104 stores an image acquired by the image acquisition unit 101 as a background image. The background updating unit 104 sets the stable background time to 0 for each of all blocks of the background image.

(B) when the Protection Area Proportion is Smaller than a Threshold Value

This case is a case where the proportion of the protection area to the area of the image is smaller than a threshold value. In this case, the background updating unit 104 updates (increments) the stable background time for each block other than blocks to which a moving object area identified by the moving object information and a human body area identified by the human body information belong. Then, the background updating unit 104 identifies blocks having a stable background time after update exceeding the time threshold value, and updates the background image with the images corresponding to the identified blocks. Then, the background updating unit 104 sets the stable background time to 0 for each of blocks that have been used to update the background image.

(C) when the Protection Area Proportion is Equal to or Larger than the Threshold Value This case is a case where the proportion of the protection area to the area of the image is equal to or larger than the threshold value. This case may occur when the illumination condition rapidly changes or when the imaging range of the imaging unit changes through panning, tilting, and zooming control. In this case, the background updating unit 104 updates (increments) the stable background time by using the human body information and without using the moving object information. When there exists a block having a stable background time exceeding the time threshold value, the background updating unit 104 updates the background image of the relevant block to generate a background image. More specifically, the background updating unit 104 sets the stable background time to 0 for each of blocks to which a human body area identified by the human body information belongs, and updates (increments) the stable background time for each of blocks to which a human body area does not belong. Then, the background updating unit 104 updates the background image with images corresponding to blocks having a stable background time exceeding the time threshold value. Further, the background updating unit 104 resets the background image for moving object detection.

More specifically, the image comparison unit 105 controls the background updating unit 104 according to the protection area and the area of acquired images (processing target images) before protection processing. In the relevant control, the background updating unit 104 generates (updates) the background image by using the result of the human body area detection by the human body detection unit 103 for detecting a human body area based on features in images and without using the result of the detection by the moving object detection unit 102 for detecting a moving object area based on the comparison between images. A protection area refer to an area having a predetermined difference in luminance based on the comparison between the luminance of the processing target images and the luminance of the background image for each area. Although, in this example, the CPU 901 determines whether to use the result of the detection by the moving object detection unit 102 to generate a background image based on the protection area proportion, the CPU 901 may use only the size of the protection area or use other information regarding the protection area instead of using the protection area proportion, to make the relevant determination. More specifically, the image comparison unit 105 controls the background updating unit 104 so that, when an evaluation value related to the protection area (specific region) is equal to or larger than a threshold value, a background image is generated without using the moving object information.

Updating (generating) the background image as described above enables displaying an image in which the protection target is protected with higher accuracy even if any environmental variation such as an illumination variation occurs.

Processing in the case (B) will be described in detail below with reference to FIGS. 2A to 5F. FIGS. 2A, 3A, 4A, and 5A illustrate images acquired from the image acquisition unit 101 (acquired images). FIGS. 2B, 3B, 4B, and 5B illustrate results of drawing the moving object information and the human body information on a white image having the same size as the acquired images (recognition results). FIGS. 2C, 3C, 4C, and 5C illustrate the stable background times. FIGS. 2D, 3D, 4D, and 5D illustrate updated background images.

FIGS. 2A, 2B, 2C, 2D, 2E, and 2F illustrate a state at a timing when image processing according to the present exemplary embodiment is started, and correspond to the above-described case (A). Typically, the case (A) refers to a timing when the image processing apparatus 100 starts generating a background image or a timing immediately after the existing background image is reset. As described above, in the case (A), the background updating unit 104 according to the present exemplary embodiment stores an image acquired from the image acquisition unit 101 as a background image as it is. Therefore, the acquired image illustrated in FIG. 2A is identical to the background image illustrated in FIG. 2D. As illustrated in FIG. 2B, neither a moving object nor a human body is detected.

FIGS. 3A, 3B, 3C, 3D, 3E, and 3F illustrate a state after a certain time period has elapsed since the state illustrated in FIGS. 2A, 2B, 2C, 2D, 2E, and 2F. A person 301 and a person 302 are captured in the acquired image illustrated in FIG. 3A. FIG. 3B illustrates a state where a moving object 303 is detected by the moving object detection processing, and a human body 304 is detected by the human body detection processing. As illustrated in FIG. 3B, for example, such a situation where the person 301 can be detected by the moving object detection processing but cannot be detected by the human body detection processing occurs depending on how a person is captured, camera installation conditions, and environmental conditions.

FIG. 3C illustrates a state where the stable background time is set to 0 for each of blocks to which a moving object area detected by the moving object detection processing and a human body area detected by the human body detection processing belong. As illustrated in FIG. 3C, the stable background time has been incremented at predetermined intervals and reached 4 for each of blocks corresponding to an area which is neither a moving object area nor a human body area.

FIG. 3D illustrates the background image updated according to the result of the comparison between the stable background times illustrated in FIG. 3C and the time threshold value. In the present exemplary embodiment, since the time threshold value is set to 6, the stable background time has not exceed the time threshold value for each block in the stage illustrated in FIGS. 3A, 3B, 3C, 3D, 3E, and 3F. Therefore, the background image has not been updated in all blocks.

FIGS. 4A, 4B, 4C, 4D, 4E, and 4F illustrate a state after a certain time period has elapsed since the state illustrated in FIGS. 3A, 3B, 3C, 3D, 3E, and 3F. A person 401 identical to the person 301, a person 402 identical to the person 302, and a picture 403 placed by the person 402 are captured in the acquired image illustrated in FIG. 4A. FIG. 4B illustrates a state where a moving object 404 is detected by the moving object detection processing, and a human body 405 is detected by the human body detection processing. FIG. 4B also illustrates a state where an area that is a combination of the newly appearing picture 403 and the person 401 is detected as the moving object 404, and the person 402 is detected as the human body 405.

FIG. 4C illustrates a state where the stable background time is set to 0 for each of blocks to which a moving object area detected by the moving object detection processing and a human body area detected by the human body detection processing belong. As illustrated in FIG. 4C, the stable background time has been incremented at predetermined intervals and reached 7 as the maximum value for each of blocks corresponding to an area which is neither a moving object area nor a human body area.

FIG. 4D illustrates a background image updated according to the result of the comparison between the stable background times and the time threshold value illustrated in FIG. 4C. Each of blocks having a stable background time of 7 out of blocks of the background image is updated based on the image acquired after the background image illustrated in FIG. 2D. The stable background time is reset to 0 for each of blocks for which the background image has been updated in the stage illustrated in FIGS. 4A, 4B, 4C, 4D, 4E, and 4F. The background updating unit 104 generates a weight average image based on weight values from a plurality of images which have been acquired while the stable background time is incremented from 0 to 7, and updates the background image with the generated image. Weight values are acquired by the parameter setting unit 108.

FIGS. 5A, 5B, 5C, 5D, 5E, and 5F illustrate a state after a certain time period has elapsed since the state illustrated in FIGS. 4A, 4B, 4C, 4D, 4E, and 4F. A person 501 identical to the person 402 and a picture 502 identical to the picture 403 are captured in the acquired image illustrated in FIG. 5A. FIG. 5A illustrates a state where the person 401 has moved out of the image. FIG. 5B illustrates a state where a human body 503 is detected by the human body detection processing, and the picture 502 is not detected by the moving object detection processing because it has become a background model after a sufficient time has elapsed since its appearance.

FIG. 5C illustrates a state where the stable background time is set to 0 for each of blocks to which a moving object area detected by the moving object detection processing and a human body area detected by the human body detection processing belong. As illustrated in FIG. 5C, the stable background time has been incremented at predetermined intervals for each of blocks corresponding to an area which is neither a moving object area nor a human body area. In particular, the picture 502 is no longer detected by the moving object detection processing, and therefore the stable background time has been incremented for each of blocks to which the picture 502 belongs.

For blocks having a stable background time higher than the time threshold value out of the stable background times illustrated in FIG. 5C, the background updating unit 104 updates the background image with the image illustrated in FIG. 5A. The background updating unit 104 generates a weight average image by using a plurality of images which have been acquired while the stable background time is incremented from 0 to 7, and updates the background image with the generated image.

A method for generating protection area information via the image comparison unit 105 will be described below. The protection area information indicates the position and shape of a protection target in the image. In the present exemplary embodiment, an area where privacy should be particularly protected is considered as a protection area.

The image comparison unit 105 generates a luminance image based on acquired images acquired from the image acquisition unit 101 and, at the same time, generates a luminance image based on the background image acquired from the background updating unit 104. Then, the image comparison unit 105 generates a difference image composed of absolute values of differences in pixel units between the luminance image based on acquired images and the luminance image based on the background image. Then, out of pixels of the relevant difference image, the image comparison unit 105 determines pixels having a larger difference value than a luminance threshold value, as protection target pixels. Then, the image comparison unit 105 identifies a protection area by connecting adjacent protection target pixels, and generates the protection area information indicating the position and shape of the protection area.

FIGS. 2E, 3E, 4E, and 5E illustrate respective protection areas corresponding to the protection area information generated based on the background images illustrated in FIGS. 2D, 3D, 4D, and 5D and the acquired images illustrated in FIGS. 2A, 3A, 4A, and 5A. The image combining unit 106 generates a protected image by combining the protection area indicated by the protection area information within the background image, with a predetermined image. The predetermined image is a blur-processed image corresponding to the position and shape identified by the protection area information. Blur processing is implemented, for example, by performing low pass filter processing on a captured image. However, the predetermined image is not limited to a blur-processed image, and may be a watermark-processed image, a mosaic image, or a monotone image (for example, an image filled black). More specifically, the image combining unit 106 performs image processing for converting into a concealed image a specific region (protection area) based on the comparison between each of processing target images acquired after the generation (updating) of the background image and the background image.

FIGS. 2F, 3F, 4F, and 5F illustrate respective protected images generated based on the background images illustrated in FIGS. 2D, 3D, 4D, and 5D and the protection area information illustrated in FIGS. 2E, 3E, 4E, and 5E. Human body areas and moving object areas are concealed as illustrated in FIGS. 2F, 3F, 4F, and 5F.

Figure 6:
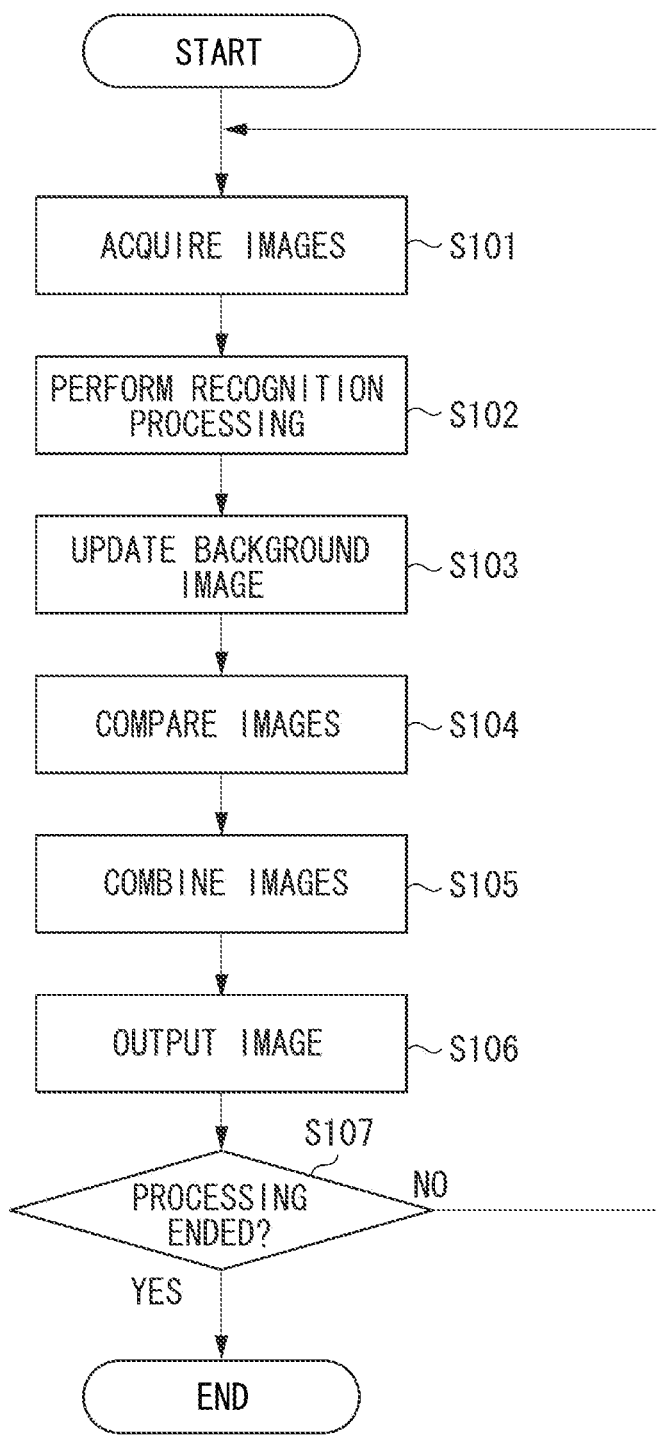
FIG. 6 is a flowchart illustrating operations of the image processing apparatus according to the exemplary embodiment.

A flow of processing of the image processing apparatus 100 according to the present exemplary embodiment will be described below. FIG. 6 is a flowchart illustrating operations of the image processing apparatus 100 according to the present exemplary embodiment. To implement the processing illustrated in FIG. 6, the CPU 901 of the image processing apparatus 100 reads and executes a program related to the processing illustrated in FIG. 6. The image processing apparatus 100 according to the present exemplary embodiment starts the processing illustrated in FIG. 6 in response to an instruction for starting privacy protection processing by the user. However, the timing for starting the processing illustrated in FIG. 6 is not limited to the above-described example.

In step S101, after starting the processing illustrated in FIG. 6, the image acquisition unit 101 acquires images. The image acquisition unit 101 according to the present exemplary embodiment is an imaging unit for acquiring images through image capturing. However, the method for acquiring images is not limited to image capturing, and hence the image processing apparatus 100 does not necessarily be provided with an imaging unit. In step S102, based on images acquired by the image acquisition unit 101, the moving object detection unit 102 performs processing for detecting a moving object by using the background subtraction method, and the human body detection unit 103 performs processing for detecting a human body by using the pattern matching method. More specifically, the moving object detection unit 102 detects a moving object area based on variations between images, and provides the background updating unit 104 with the moving object information (the center coordinates (position information) and the circumscribed rectangle (shape information) of the moving object) acquired by the relevant detection. The human body detection unit 103 detects a human body area based on features in images, and provides the background updating unit 104 with the human body information (the center coordinates (position information) and the circumscribed rectangle (shape information) of the human body) acquired by the relevant detection.

In step S103, the background updating unit 104 performs processing for updating (generating) the background image based on the moving object information and the human body information. More specifically, the background updating unit 104 increments the value of the stable background time for each of blocks which have been detected as neither a moving object area nor a human body area, at predetermined intervals. Then, for blocks having a stable background time exceeding a threshold value, the background updating unit 104 updates the relevant blocks of the background image with the images of the relevant blocks. Then, the background updating unit 104 provides the image comparison unit 105 with the updated background image. Although the present exemplary embodiment has specifically been described above centering on a case where the stable background time is managed on a block basis, one block may have any size and any shape.

In step S104, the image comparison unit 105 generates the protection area information based on the comparison between each of acquired images acquired from the image acquisition unit 101 and the background image acquired from the background updating unit 104. The protection area information includes information about the position and shape of the protection area. The image comparison unit 105 generates protection area proportion information according to the protection area relative to the area of an acquired image. Although the present exemplary embodiment has specifically been described above centering on a case where the moving body information is not used to update the background image when the proportion of the protection area to the area of the acquired image is equal to or larger than a threshold value, the present invention is not limited to this example. For example, the CPU 901 may determine that an illumination variation has occurred when not the area proportion but the size of the protection area is equal to or larger than a threshold value, and perform processing for generating a background image without using the moving object information. The image comparison unit 105 provides the image combining unit 106 with the generated protection area information and the protection area proportion information.

In step S105, the image combining unit 106 generates a protected image based on the background image acquired from the background updating unit 104 and the protection area information acquired from the image comparison unit 105. More specifically, the image combining unit 106 performs blur processing (concealment processing) on the image corresponding to the protection area indicated by the protection area information within the acquired images (captured images). Then, the image combining unit 106 combines the blur-processed image with the background image to generate a protected image. The image combining unit 106 provides the output unit 107 with the generated protected image.

In step S106, the output unit 107 displays the protected image. More specifically, the output unit 107 displays a protected image in which the protection area (specific region) based on the comparison between each of acquired images (processing target images) acquired after the generation (updating) of the background image and the background image has become a concealed image. For example, when the image processing apparatus 100 is mounted on a network camera, when a protected image is transmitted to a monitoring apparatus connected via a network, the relevant protected image is displayed on the relevant monitoring apparatus. Further, for example, when a protected image is transmitted to a recording apparatus, the relevant protected image will be displayed on the monitoring apparatus which acquires the protected image from the relevant recording apparatus. On the other hand, when the image processing apparatus 100 is mounted on a monitoring apparatus, a protected image will be generated by the monitoring apparatus, and the relevant protected image will be displayed on a display unit of the monitoring apparatus.

Although masking processing and filter processing are assumed as blur processing (concealment processing), for example, a predetermined image (for example, a black image) may be combined with the protection area, and mosaic processing may be performed as concealment processing. In step S107, upon completion of the processing in step S106, the CPU 901 determines whether to continue or end the processing illustrated in FIG. 6. When the CPU 901 determines to continue the relevant processing (NO in step S107), the processing returns to step S101.

As described above, the image processing apparatus 100 generates a background image by using a plurality of detection units (the moving object detection unit 102 and the human body detection unit 103). This configuration enables mutually compensating failed detections by respective detection units, making a protection target image harder to be contained in the background image. Then, the image processing apparatus 100 identifies a protection area from the background image generated as described above and captured images, and displays a protected image in which the protection area has become a concealed image. This enables the user to recognize the existence of a human body and a moving object in the protection area while protecting privacy.

Although the present exemplary embodiment has specifically been described above centering on a case where a plurality of detection units is the moving object detection unit 102 and the human body detection unit 103, the detection units are not limited to thereto. A face detection unit for detecting a face, a specific object detection unit for detecting a specific object (for example, an automobile), and a detection unit for detecting an unmoving object may be used as a plurality of the detection units. Further, three or more detection units may be used as a plurality of the detection units. Using a larger number of detection units enables generating a background image in which a protection target image is harder to be contained.

When the protection area is equal to or larger than a fixed area, the background updating unit 104 is able to decrease the contribution rate of the detection units subjected to the influence of environmental variations on the updating of the background image. For example, when a detection unit for detecting an object other than a protection target object, such as an unmoving object detection unit, is used, the background updating unit 104 sets the stable background time for an area where the unmoving object detection unit has detected an unmoving object, to a value equal to or larger than the time threshold value, enabling the background image to be immediately updated. Further, for example, when the moving object detection unit 102 is used as a detection unit, the background updating unit 104 may set the stable background time for an area where the moving object detection unit 102 has not detected a moving object, to a value equal to or larger than the time threshold value, enabling the background image to be immediately updated.

In the processing for updating the background image by the background updating unit 104, the image of a periodically moving object area such as an escalator, an automatic door, etc., and the image of an irregularly moving object area such as a door, a window, etc. are averaged through a series of motions, possibly resulting in a defocused image, in processing based on the weight average. Therefore, the background updating unit 104 determines motion features such as the periodicity of a periodically moving object area and the motion pattern of an irregularly moving object area. Then, the background updating unit 104 is able to employ a method for replacing an area where the relevant features satisfy a predetermined condition with a prepared still image for the relevant area, and a method for filling the relevant area with a specific color. This configuration enables improving the visibility of the display screen.

Although the present exemplary embodiment has specifically been described above centering on a case where the image combining unit 106 generates a protected image by combining a concealment-processed protection area with the background image, the processing is not limited thereto. For example, a protected image may be generated by filling the protection area in the background image black. Further, an image in which the protection area, within the background image is replaced with a prepared still image may be generated as a protected image.

Although the present exemplary embodiment has specifically been described above centering on a case where the stable background time is managed on a block basis, one block may have any size and any shape. Further, each block may have a different shape within the image. Further, the stable background time may be managed not on a block basis but on a pixel basis.

Although, in the present exemplary embodiment, the background updating unit 104 uses a weight average image when updating the background image area, the method is not limited thereto. The area updating may be based on a method for replacing the background image by using an acquired image, such as a method for replacing the relevant area of the acquired image with the background image, and a method for sequentially replacing the relevant area on a pixel basis.

Although the above-described exemplary embodiment has specifically been described centering on a case where the moving object detection unit 102 detects a moving object area based on the comparison between each of acquired images and the background model, another unit may perform moving object detection based on range images, instead of the moving object detection unit 102 or in addition to the moving object detection unit 102.

Figure 7:
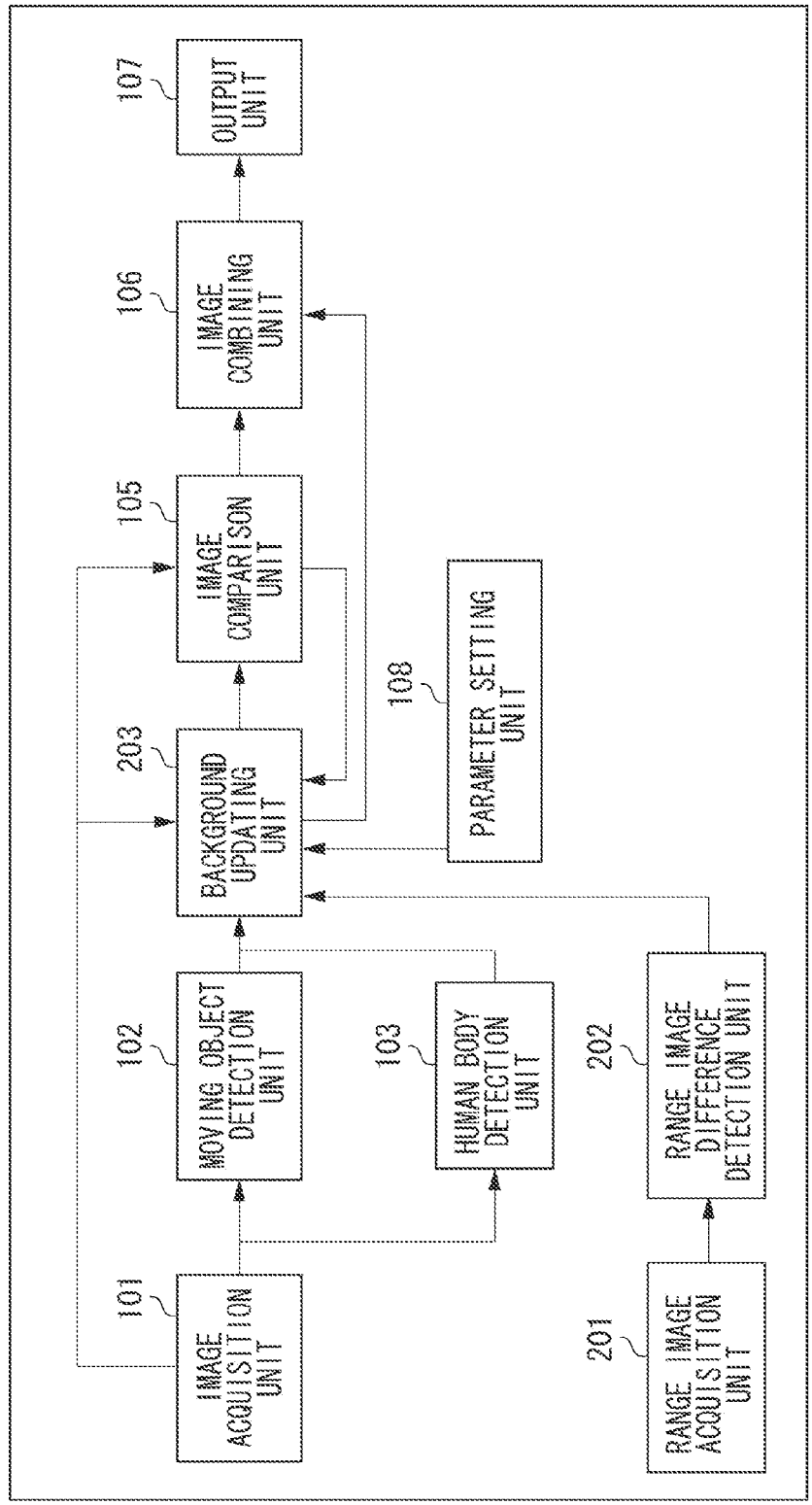
FIG. 7 is a block diagram illustrating a module configuration of the image processing apparatus according to the exemplary embodiment.

FIG. 7 illustrate an example of a configuration of the image processing apparatus 100 including a range image difference detection unit 202 for performing moving object detection based on range images, in addition to the moving object detection unit 102. The units 101 to 108 are similar to those illustrated in FIG. 1.

The range image acquisition unit 201 acquires range images through the Time-of-Flight (TOF) method or a method using infrared ray. However, the method for acquiring range images by the range image acquisition unit 201 is not limited to the above-described method. The range image acquisition unit 201 provides the range image difference detection unit 202 with the acquired range images.

The range image difference detection unit 202 detects a moving object area based on the difference between a plurality of range images acquired from the range image acquisition unit 201. More specifically, the range image difference detection unit 202 detects, as a moving object area, the area of each of a plurality of temporally adjacent range images in which a range variation is equal to or larger than a threshold value. When an object is moving in the same direction as the image capturing direction of the imaging unit, using range images makes it easier to detect the motion of the relevant object.

The background updating unit 203 sets to 0 the stable background time for a moving object area detected by the moving object detection unit 102, a human body area detected by the human body detection unit 103, and a moving object area detected by the range image difference detection unit 202. Further, the background updating unit 203 increments the stable background time for each area which is neither a moving object area detected by the moving object detection unit 102, a human body area detected by the human body detection unit 103, nor a moving object area detected by the range image difference detection unit 202. Then, for blocks having a stable background time exceeding the time threshold value, the background updating unit 203 updates the relevant blocks of the background image with the images of the relevant blocks.

When the protection area proportion is higher than a threshold value, the stable background time may be updated based on a moving object area detected by the range image difference detection unit 202 without using the results of the detections by the moving object detection unit 102 and the human body detection unit 103. By doing so, for example, if illumination variations cause incorrect detection by the moving object detection unit 102 or the human body detection unit 103, the above-described processing enables updating the stable background time by using range images acquired with invisible light, thus reducing the possibility of incorrect detection of a moving object area.

Operations by the image processing apparatus 100 when performing moving object detection by using a range image will be described below, centering on differences from operations without using range images, with reference to FIG. 6. In step S101, the image acquisition unit 101 acquires images, and the range image acquisition unit 201 acquires range images. The range image acquisition unit 201 provides the range image difference detection unit 202 with the acquired range images.

In step S102, the range image difference detection unit 202 detects a moving object area based on the differences between a plurality of the range images. More specifically, the range image difference detection unit 202 identifies the difference in range for the area of each of a plurality of temporally adjacent range images, and identifies an area having a relevant difference equal to or larger than a threshold value. However, the method for detecting a moving object area by the range image difference detection unit 202 is not limited to the above-described method. The range image difference detection unit 202 provides the background updating unit 104 with the moving object information about the position and shape (the center coordinates (position information) and the circumscribed rectangle (shape information)) of the acquired moving object area.

In step S103, based on the results of the detections by the moving object detection unit 102, the human body detection unit 103, and the range image difference detection unit 202, the background updating unit 104 updates (increments or resets) the stable background time, and updates the background image of each area having a stable background time exceeding a threshold value.

As described above, performing processing by using range images enables detecting a difference which cannot be detected by general image processing on captured images. Updating the background image by using the relevant detection result enables achieving higher privacy protection performance.

Although, range images are used in the above-described example, it is possible to use various invisible images such as infrared images, thermal images, and range images acquired by using a stereo camera.

The above-described exemplary embodiment has specifically been described centering on a case where the stable background time is updated by using a plurality of detection units to update the background image. Processing for updating the background image by using only the result of the moving object detection processing by the moving object detection unit 102 will be described below. In this case, the image processing apparatus 100 does not need to include the human body detection unit 103.

When the protection area proportion is higher than a predetermined proportion, the background updating unit 104 of the image processing apparatus 100 changes settings so that the moving object detection unit 102 updates the background model at an earlier timing than when the protection area proportion is lower than the predetermined proportion. More specifically, when the protection area proportion (the ratio of the size of the protection area to the size of the acquired image) is equal to or larger than a predetermined proportion, the moving object detection unit 102 updates at early timing the background model used to detect a moving object. Then, the moving object detection unit 102 detects a moving object through the comparison between the updated background model and acquired images, and provides the background updating unit 104 with the moving object information indicating the position and shape of the detected moving object.

As described above, when the protection area proportion acquired by the image comparison unit 105 is equal to or larger than a threshold value, the background model is updated at an earlier timing than when the relevant protection area proportion is smaller than the threshold value. This makes the moving object detection unit 102 harder to incorrectly detect a moving object to a further extent.

Instead of the protection area proportion, the timing of updating the background model may be controlled based on the area (size) of the protection area. More specifically, when the area of the protection area acquired by the image comparison unit 105 is equal to or larger than a threshold value, the moving object detection unit 102 is able to control the timing of updating the background model so that the background model is updated at an earlier timing than when the relevant area is smaller than the threshold value.

Figure 8:
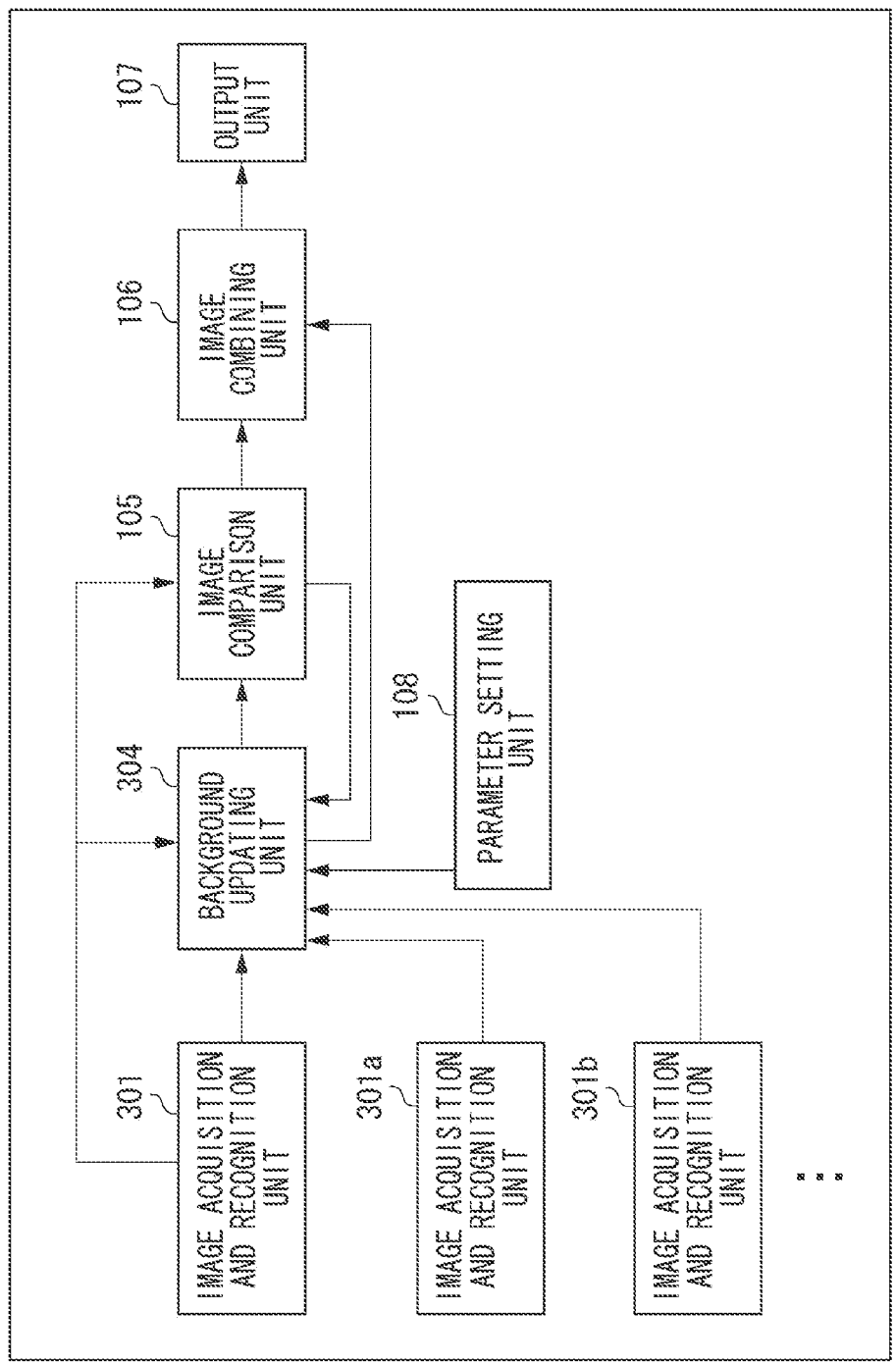
FIG. 8 is a block diagram illustrating a module configuration of the image processing apparatus according to the exemplary embodiment.

Although, in the above-described exemplary embodiment, the image processing apparatus 100 includes one image acquisition unit 101, the image processing apparatus 100 may include a plurality of the images acquisition units 101. FIG. 8 is a block diagram illustrating a configuration when the image processing apparatus 100 includes a plurality of the images acquisition units 101. An image acquisition and recognition unit 301 illustrated in FIG. 8 combines the image acquisition unit 101, the moving object detection unit 102, and the human body detection unit 103 illustrated in FIG. 1. The image acquisition and recognition unit 301 functions as an imaging unit including a lens and a sensor, and acquires images at predetermined intervals. Then, the image acquisition and recognition unit 301 provides the background updating unit 104 and the image comparison unit 105 with the acquired images. The image acquisition and recognition unit 301 performs the moving object detection processing and the human body detection processing on the acquired images, and provides the background updating unit 304 with the acquired moving object information and human body information. The image acquisition and recognition units 301a and 302b acquire respective images captured by different imaging units. Each of the image acquisition and recognition units 301a and 301b functions in a way similar to the image acquisition and recognition unit 301, and provides the background updating unit 104 with images, the moving object information, and the human body information. The image acquisition and recognition units 301, 301a, and 301b acquire respective images captured in different image capturing directions. Further, respective imaging ranges corresponding to the image acquisition and recognition units 301, 301a, and 301b overlap with each other. However, the imaging ranges do not need to be completely identical.

Although, in the above-described case, three image acquisition and recognition units 301 exist, the number of the relevant units is not limited to three. Although, in a case to be described below, the image acquisition and recognition unit 301 may be an imaging unit, and the image acquisition and recognition units 301a and 301b acquire captured images by using respective imaging units different from the imaging unit of the image acquisition and recognition unit 301, the image acquisition and recognition units 301a and 301b may be imaging units. In this case, the image processing apparatus 100 includes a plurality of imaging units for capturing images of a subject from different directions.

The background updating unit 304 converts the center coordinates and the circumscribed rectangle of a moving object indicated by the moving object information, and the center coordinates and the circumscribed rectangle of a human body indicated by the human body information acquired from the image acquisition and recognition units 301a and 301b into coordinates in the field angle of the image acquisition and recognition unit 301. More specifically, the background updating unit 304 converts the moving object information and the human body information from the image acquisition and recognition unit 301a based on the relation between the installation position and the image capturing direction of the imaging unit corresponding to the image acquisition and recognition unit 301a and the installation position and the image capturing direction of the imaging unit corresponding to the image acquisition and recognition unit 301. Further, the background updating unit 304 converts the moving object information and the human body information from the image acquisition and recognition unit 301b based on the relation between the installation position and the installation direction of the imaging unit corresponding to the image acquisition and recognition unit 301b and the installation position and the installation direction of the imaging unit corresponding to the image acquisition and recognition unit 301. With this conversion, the moving object area corresponding to the moving object information and the human body area corresponding to human body information from the image acquisition and recognition unit 301a can be represented on the captured images acquired by the image acquisition and recognition unit 301. This also applies to the image acquisition and recognition unit 301b.

Then, the background updating unit 104 generates a background image by using the moving object information and the human body information from the image acquisition and recognition unit 301, information after conversion of the moving object information and the human body information from the image acquisition and recognition unit 301a, and information after conversion of the moving object information and the human body information from the image acquisition and recognition unit 301b. More specifically, the background updating unit 104 resets to 0 the stable background time for each area identified by the moving object information and the human body information from the image acquisition and recognition units 301, 301a, and 301b, and increments the stable background time for each unidentified area. Then, for each area having a stable background time exceeding a threshold value, the background updating unit 104 updates the relevant area of the background image with the acquired image of the relevant area.

The above-described configuration enables the image processing apparatus 100 to detect a moving object area and a human body area by using images captured from a plurality of different directions, and to generate a background image by using the result of the relevant detection. Therefore, if there is an area recognized as a dead angle by a certain unit, the relevant dead angle can be compensated by images from other imaging units, making a moving object and a human body harder to be contained in the background image. As a result, a human body area and a moving object area can be detected from the acquired images with higher precision, enabling displaying a protected image in which an area subjected to the privacy protection is concealed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254600, filed Dec. 16, 2014, which is hereby incorporated by reference herein in its entirety.

What is claimed is:

1. An image processing apparatus comprising:
a computer executing instructions that, when executed by the computer, cause the computer to function as:
an input unit configured to input an image;
a determination unit configured to determine, based on the image and a background image, a specific area to be masked, by using a background subtraction method;
a processing unit configured to generate a mask image for masking the specific area determined by the determination unit and further configured to generate a protected image by combining the background image and the mask image corresponding to the specific area determined by the determination unit;
a first detection unit configured to perform first detection for detecting, by using pattern matching, a first area corresponding to a human body in the image, wherein a result of the first detection is used for updating the background image;
a second detection unit configured to perform second detection for detecting, by using the background subtraction method, a second area corresponding to a moving object in the image, wherein a result of the second detection is used for updating the background image; and an updating unit configured to update the background image by using the result of the first detection by the first detection unit and the result of the second detection by the second detection unit if a proportion of the specific area, determined by the determination unit, to an area of the image is smaller than a threshold value, and update the background image by using the result of the first detection by the first detection unit and not using the result of the second detection by the second detection unit if the proportion is equal to or larger than the threshold value.

2. The image processing apparatus according to claim 1, wherein the first detection unit detects the first area based on a comparison between the image input by the input unit and a predetermined pattern image.

3. The image processing apparatus according to claim 1, wherein the second detection unit detects the second area based on a comparison between images input by the input unit, wherein the images are captured at different times.

4. The image processing apparatus according to claim 3, wherein each of the plurality of the images used to detect the second area is an invisible image captured based on invisible light.

5. The image processing apparatus according to claim 1, wherein the input unit inputs a plurality of images, the first detection unit performs the first detection for detecting the first area from each of the plurality of images, the second detection unit performs the second detection for detecting the second area from each of the plurality of images, and the updating unit updates the background image by using each of a plurality of the results of the first detection from the plurality of images and using each of a plurality of the results of the second detection from the plurality of images if the proportion is smaller than the threshold value, and updates the background image by using each of the plurality of the results of the first detection from the plurality of images and not using the results of the second detection if the proportion is equal to or larger than the threshold value.

6. An image processing method comprising:

an input step for inputting an image;

a determination step for determining, based on the image and a background image, a specific area to be masked, by using a background subtraction method;

a processing step for generating a mask image for masking the specific area determined in the determination step and further for generating a protected image by combining the background image and the mask image corresponding to the specific area determined in the determination step;

a first detection step for performing first detection for detecting, by using pattern matching, a first area corresponding to a human body in the image, wherein a result of the first detection is used for updating the background image;

a second detection step for performing second detection for detecting, by using the background subtraction method, a second area corresponding to a moving object in the image, wherein a result of the second detection is used for updating the background image;

a first updating step for updating the background image by using the result of the first detection in the first detection step and the result of the second detection in the second detection step if a proportion of the specific area, determined in the determination step, to an area of the image is smaller than a threshold value; and a second updating step for updating the background image by using the result of the first detection in the first detection step and not using the result of the second detection in the second detection step if the proportion is equal to or larger than the threshold value.

7. The image processing method according to claim 6, wherein a plurality of images is input in the input step, the first detection for detecting the first area from each of the plurality of images is performed in the first detection step, the second detection for detecting the second area from each of the plurality of images is performed in the second detection step, the background image is updated in the first updating step by using each of a plurality of the results of the first detection from the plurality of images and using each of a plurality of the results of the second detection from the plurality of images if the proportion is smaller than the threshold value, and the background image is updated in the second updating step by using each of the plurality of the results of the first detection from the plurality of images and not using the results of the second detection if the proportion is equal to or larger than the threshold value.

8. A non-transitory computer-readable medium storing a program for causing a computer to execute a method comprising:

an input step for inputting an image;

a determination step for determining, based on the image and a background image, a specific area to be masked, by using a background subtraction method;

a processing step for generating a mask image for masking the specific area determined in the determination step and further for generating a protected image by combining the background image and the mask image corresponding to the specific area determined in the determination step;

a first detection step for performing first detection for detecting, by using pattern matching, a first area corresponding to a human body in the image, wherein a result of the first detection is used for updating the background image;

a second detection step for performing second detection for detecting, by using the background subtraction method, a second area corresponding to a moving object in the image, wherein a result of the second detection is used for updating the background image;

a first updating step for updating the background image by using the result of the first detection in the first detection step and the result of the second detection in the second detection step if a proportion of the specific area, determined in the determination step, to an area of the image is smaller than a threshold value; and a second updating step for updating the background image by using the result of the first detection in the first detection step and not using the result of the second detection in the second detection step if the proportion is equal to or larger than the threshold value.

9. The non-transitory computer-readable medium according to claim 8, wherein a plurality of images is input in the input step, the first detection for detecting the first area from each of the plurality of images is performed in the first detection step, the second detection for detecting the second area from each of the plurality of images is performed in the second detection step, the background image is updated in the first updating step by using each of a plurality of the results of the first detection from the plurality of images and using each of a plurality of the results of the second detection from the plurality of images if the proportion is smaller than the threshold value, and the background image is updated in the second updating step by using each of the plurality of the results of the first detection from the plurality of images and not using the results of the second detection if the proportion is equal to or larger than the threshold value.

* * * * *